United States Patent [19]

Greene

[11] 4,053,883
[45] Oct. 11, 1977

[54] FIXED DUAL BEAM RANGE SCANNING AND TRACKING RADAR WITH DIGITAL DISPLAY

[75] Inventor: Leonard M. Greene, Chappaqua, N.Y.

[73] Assignee: Safe Flight Instrument Corporation, White Plains, N.Y.

[21] Appl. No.: 676,982

[22] Filed: Apr. 14, 1976

[51] Int. Cl.² .............................................. G01S 9/02
[52] U.S. Cl. ................................. 343/7.3; 343/5 DP; 343/13 R
[58] Field of Search ................... 343/5 DP, 7.3, 13 R; 356/4, 5

[56] References Cited

U.S. PATENT DOCUMENTS

| | | | |
|---|---|---|---|
| 3,035,262 | 5/1962 | Vantine, Jr. | 343/13 R X |
| 3,087,151 | 4/1963 | Vantine, Jr. | 343/13 R X |
| 3,112,480 | 11/1963 | Lakatos | 343/9 |
| 3,614,286 | 10/1971 | Trinite, Jr. | 343/7.3 X |
| 3,936,823 | 2/1976 | Weber | 343/7.3 |

Primary Examiner—S. C. Buczinski
Attorney, Agent, or Firm—Edward A. Sokolski

[57] ABSTRACT

A light weight, low power radar principally adapted for use on small vehicles such as sailboats, which has a fixed antenna providing a continuous forward looking beam which provides range information and limited azimuth information in manual and automatic range scanning modes of operation, and which is capable of automatically tracking targets in range. In the manual mode of operation, a voltage representing a manually selected range is compared with a sweep voltage synchronized with the radar transmitter pulse to generate a pulse having a time relationship to the transmitter pulse corresponding to the selected range. This pulse is utilized to gate a video echo from the radar receiver to logical control circuit which operates in conjunction with the antenna lobing control to actuate a display indicating whether the target is to port or starboard of the vehicle heading. The range voltage is also converted to digital form for display on a digital display device. In the automatic scanning mode, the range scale of the radar is scanned at a slow speed by a sweep voltage representing this range scale. At any ranges at which targets appear, the scan is interrupted for a short period of time during which time the range voltage for this particular portion of the scan is gated through for conversion to digital form and displayed on the digital range display. In the tracking mode, a target to be range tracked is selected from either the manual or scan mode and automatically locked onto by means of a range tracking circuit. During the tracking mode, the range voltage is continually converted to digital form and displayed on the digital range display. The range rate (speed) of the target and the estimated time of arrival (ETA) to the target are computed. Either one can be selected for display on a second digital display.

15 Claims, 11 Drawing Figures

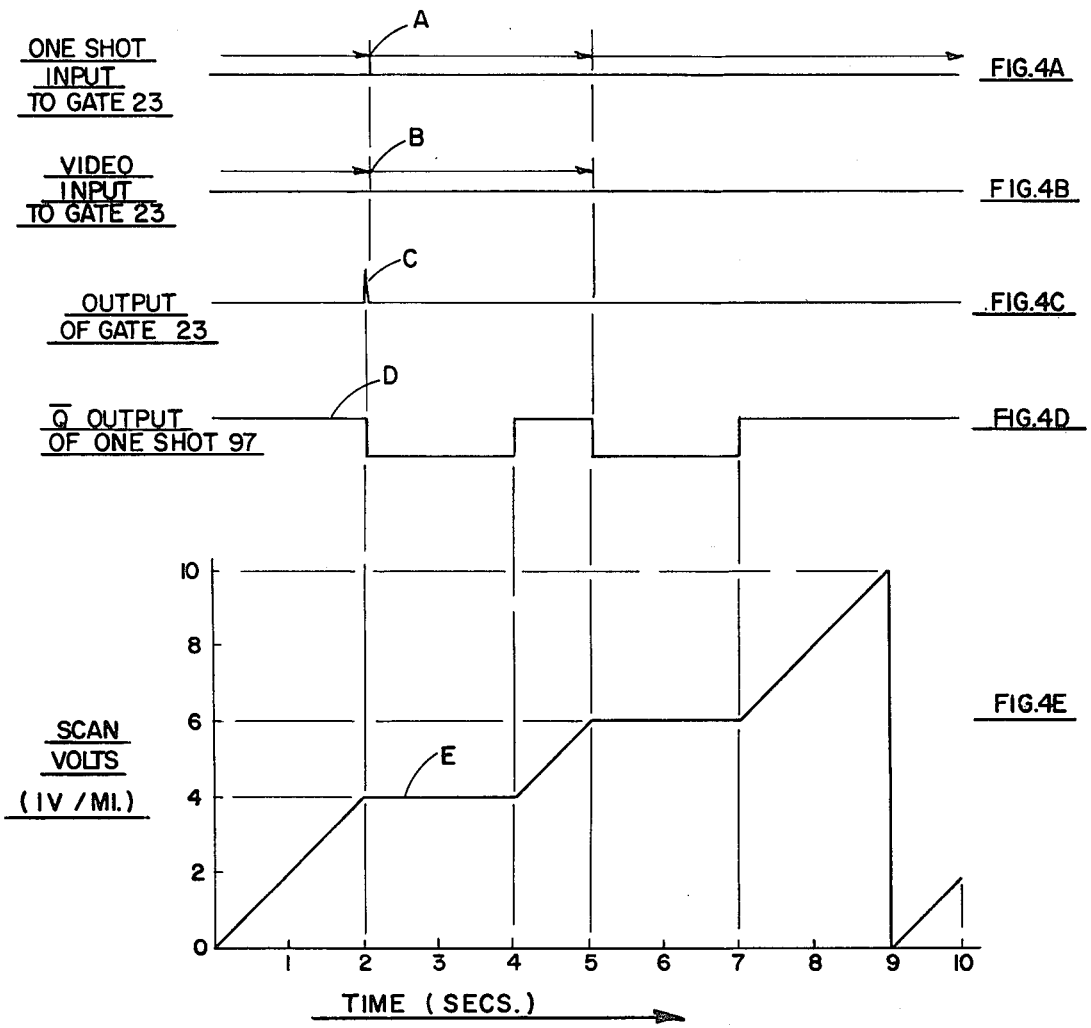
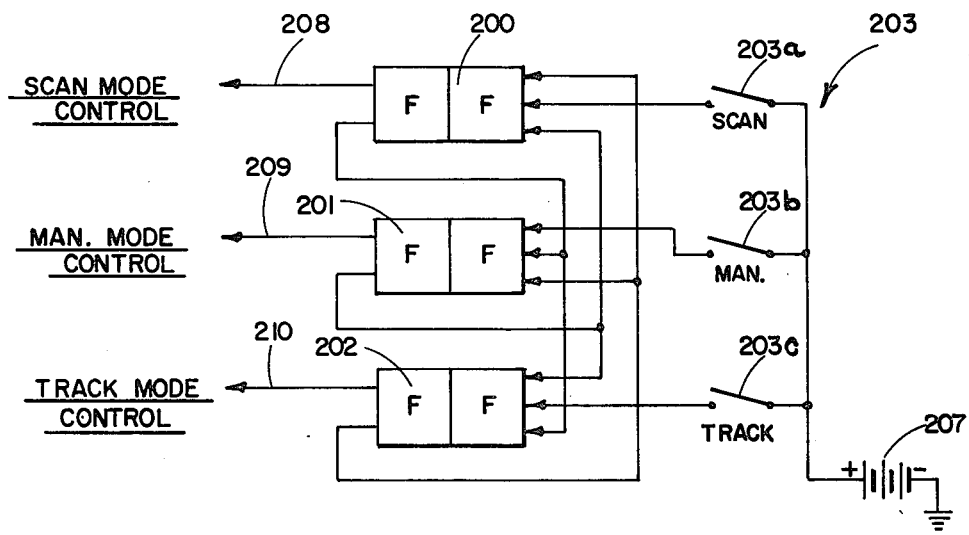

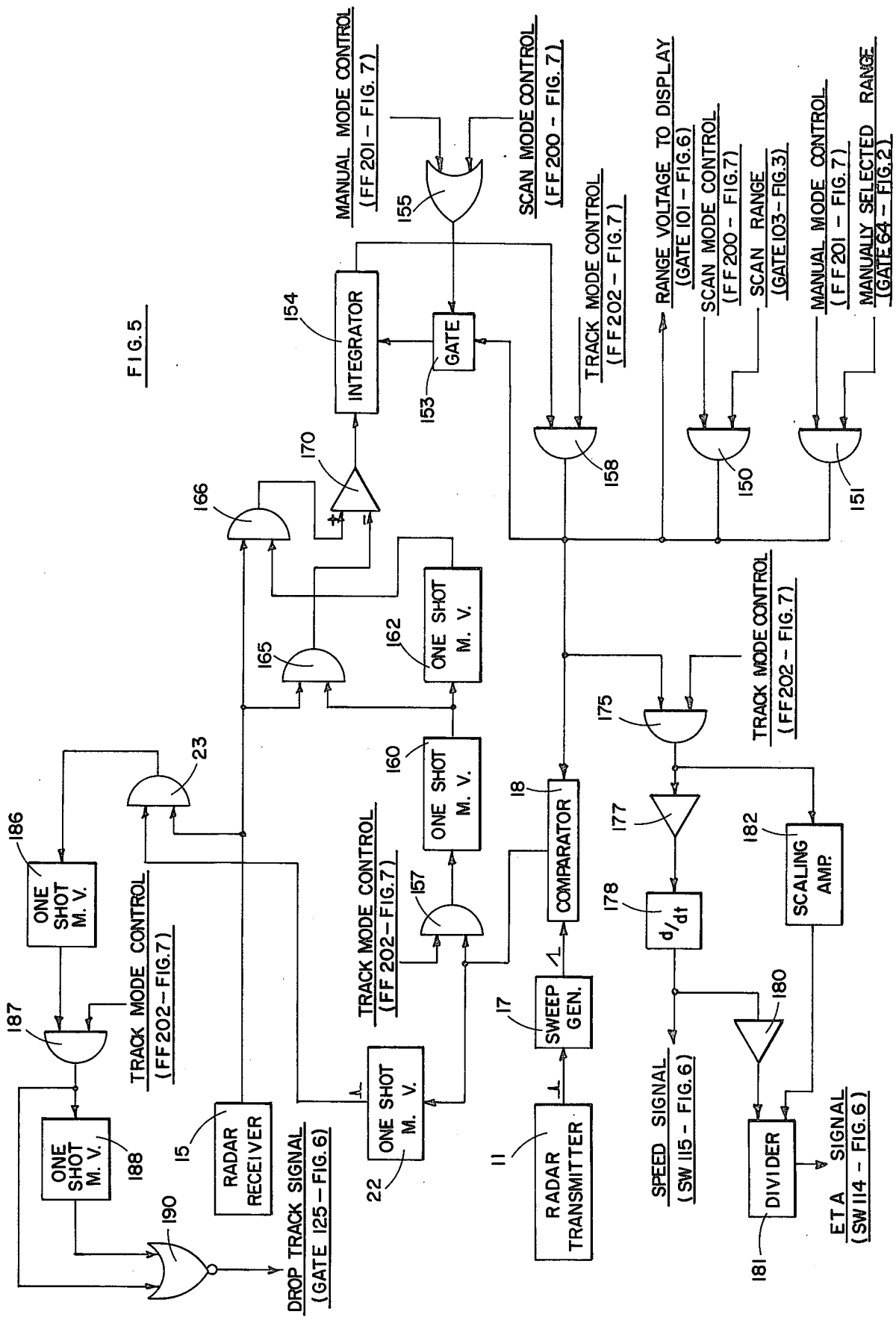

FIXED DUAL BEAM RANGE SCANNING AND TRACKING RADAR WITH DIGITAL DISPLAY

This invention relates to radar equipment, and more particularly to such equipment having a fixed dual beam and capable of range scanning and tracking modes of operation in conjunction with a digital display.

In my U.S. Pat. application Ser. No. 517,164, filed Oct. 23, 1974, now U.S. Pat. No. 3,955,195, issued May 4, 1976 a fixed beam radar having a dual range light display is described which is capable of indicating target range and relative target azimuth. This radar equipment is particularly suitable for use on small vehicles such as sailboats, in view of the fact that it has low power drain, is light and compact in construction, and is of relatively low cost. In the system of the aforementioned prior application, range and azimuth information on targets is provided by means of a dual lamp bank, one for indicating the ranges of targets to the right of vehicle heading, the other bank providing range information on targets to the left of the vehicle heading.

The present invention utilizes the same basic radar transmitter, receiver and antenna as that described in my aforementioned patent application and utilizes two indicator lamps for indicating whether a selected target is to the right or left of vehicle heading. However, rather than relying on banks of indicator lamps for indicating target range, a more accurate and more easily readable indication of target range is provided by means of a digital display. Further, the system of the present invention provides alternative operation in any one of three modes, which include a manual code for manually scanning and selecting targets, a scan mode for automatically scanning the entire range scale and providing a digital readout of the ranges of targets which appear during the scan, and a tracking mode in which selected targets can be automatically range tracked with a digital readout of the range of the target being continually provided.

It is therefore an object of this invention to provide a simple economical lightweight radar equipment for use on vehicles such as sailboats, which has a digital readout and an automatic scanning and target tracking capbility.

Other objects of the invention will become apparent as the description proceeds in connection with the accompanying drawings, of which:

FIGS. 4A-4E are a series of waveform illustrations pertinent to the scan mode of operation of the preferred embodiment;

FIG. 5 is a functional block diagram illustrating the tracking mode of operation of the preferred embodiment;

FIG. 7 is a functional block diagram illustrating the mode control of the preferred embodiment.

Briefly described, the system of the invention is as follows: Radar pulses are generated in a radar transmitter and radiated by means of a fixed antenna in the direction of the heading of the vehicle on which the equipment is installed. Antenna lobing is provided so that echoes received from targets to the left and to the right of the antenna bore sight can be synchronously discriminated. In a manual mode of operation, a voltage is generated in accordance with a manually selected range, and this voltage compared with the output of a sweep generator synchronized with the transmitter pulse of the radar. A pulse is generated from the comparator output which is time referenced to the transmitter pulse so as to represent the selected range. This range pulse is utilized to gate video echoes which may be received by the radar receiver through to control logic synchronized with the antenna lobing control. The control logic operates to actuate a "port" or "starboard" indicator, indicating whether the target is to the left or right of vehicle heading. The voltage output of the manual range selector is also converted to digital form and this digital signal fed to a digital display, which indicates the manually selected range.

In the scan mode of operation, the gated video is used to provide port and starboard indication as in the manual mode. Additionally, a range scan generator is used to generate a slowly scanning range voltage. The scanning operation of the range scan generator is interrupted for a predetermined pause in response to a scan pause control whenever video signals representing target echoes are gated by the range pulse. Whenever such a pause in scanning occurs, the range voltage during such pause is converted to digital form and provided to the digital display thus successively indicating the ranges of targets which appear during each range scan. The tracking mode of operation can be entered into from either the manual or scan mode by depressing a track button. During this mode, a range tracking circuit is employed to lock on (in range only) to the selected target. As for the previous modes of operation, port or starboard indication for the target is provided and a continual digital display of the target range appears on the digital display. Information as to the speed and ETA of a target being tracked are also computed from the tracking range signal and converted to digital form for display on a second digital display device.

Figure 1:
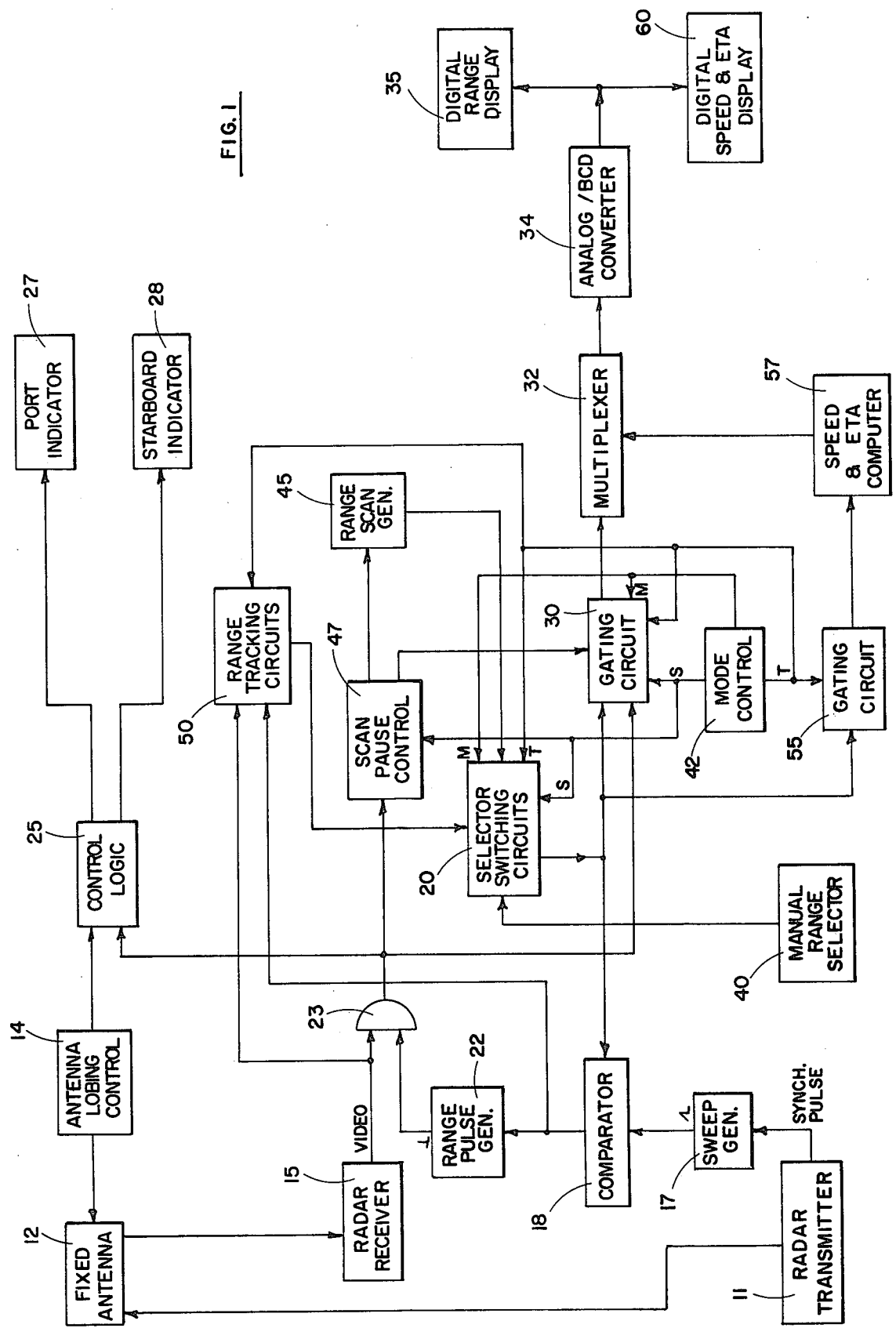
FIG. 1 is a functional schematic of the system of the invention.

Referring now to FIG. 1, the basic features of the invention are schematically illustrated. Radar pulses are generated by means of radar transmitter 11 and fed to fixed antenna 12 which may be mounted on the mast of a boat to radiate a fixed beam in the leading direction of the boat. Antenna lobing control 14 operates to alternately provide antenna pattern lobes to the left and right of the antenna boresight. Echoes received by antenna 12 are fed to radar receiver 15 where they are amplified and converted to video form. The system thus far described is similar to that of my aforementioned Patent Application. Sweep generator 17 is a conventional radar range sweep generator which generates a linear sawtooth sweep voltage which is synchronized with each of the transmitter pulses of radar transmitter 11. The sweep voltage output of sweep generator 17 is fed to comparator 18 where it is compared with a DC voltage representing either a manually selective range, a scanning range, or a tracking range received from selector switching circuits 20. How these various voltages are generated will be described later on. Suffice it to say at this point that the voltage in each instance represents a range at which a target echo appears.

Comparator 18 produces an output when the sweep voltage output of sweep generator 17 reaches the voltage received by the comparator from selector switching circuits 20. Such an output from comparator 18 causes range pulse generator 22 to generate a pulse which is fed to AND gate 23. Also fed to AND gate 23 is the video output of radar receiver 15 representing target echoes received by the receiver. Thus, AND gate 23 will provide an output whenever the pulse output of range pulse generator 22 is in time coincidence with video output from the radar receiver which represents target echoes. In this manner, a pulse signal is generated in a proper time relationship to the radar transmitter pulses so as to represent the range of target echoes received by the receiver.

The output of AND gate 23 is fed to control logic 25. Control logic 25 operates to feed the signals representing target ranges to port and starboard indicators 27 and 28 in response to antenna lobing control 14. Thus, when the video echoes fed from radar receiver 15 to AND gate 23 arrive while the antenna is lobing is the left, the control logic will feed the signals through to port indicator 27 to provide an indication thereon, while for targets received while the antenna is lobing to the right, the control logic will feed actuation signals to starboard indicator 28. Port and starboard indicators 27 and 28 may be indicator lamps of the type described in my above mentioned prior patent application.

The target range signal is also fed from AND gate 23 to gating circuit 30 and operates to gate the range voltage at that moment being fed to comparator 18 from selector switching circuits 20, through to multiplexer 32. The analog range signals are fed through the multiplexer to analog/BCD converter 34, where they are converted to binary coded decimal form, and from the converter to digital range display 35 which provides a range readout. In this manner, a digital readout of the range of targets represented by video echoes is provided.

Let us now examine the various modes of operation of the system:

In the MANUAL mode, a manually selected voltage (selected by means of a potentiometer and a DC voltage source as to be explained in connection with FIG. 2) is fed from manual range selector 40 to selector switching circuits 20. The manually selected voltage is set by the operator to coincide with a target by varying the setting of the range selector until actuation of one or both of indicators 25 and 27 is observed. Mode control 42 is set in the manual (M) mode so as to actuate selector switching circuits 20 whereby the voltage selected by the manual range selector is fed from the switching circuits to both comparator 18 and gating circuit 30. The gating circuit is also actuated by the mode control and by the output of AND gate 23 (indicative of the coincidence between the range voltage and video echoes) so as to gate the range voltage through to multiplexer 32 from where it is converted to binary coded digital form in converter 34, and finally displayed on digital display 35. In this manner, a range display is provided for any target which may appear at the range selected by manual range selector 40.

In the SCAN mode, a scan control signal (S) is fed from mode control 42 to selector switching circuits 20 which gates the output of range scan generator 45 through to comparator 18 and gating circuit 30. Range scan generator 45 generates a slow scan having a scanning cycle of the order of 5 seconds when no targets are present. The scan of range scan generator 45 is interrupted by means of scan pause control 47 for a period of time of the order of 2 seconds each time a video echo coincides with the range scanning voltage as indicated by an output from AND gate 23. Thus, the output of range scan generator 45 is fed through selector switching circuits 20 to comparator 18 where it is compared with the output of sweep generator 17. With coincidence between these two signals, comparator 18 actuates range pulse generator 22 to provide the range gating signal for AND gate 23 whenever a video echo appears. For each such echo, the range scanning of range scan generator 45 is interrupted for about 2 seconds by scan pause control 47. A gating signal is fed from scan pause control 47 to gating circuit 30 such that during the pause in the scan, the range voltage is fed from the range scan generator 45 through selector switching circuit 20 and gating circuit 30 to multiplexer 32 for conversion to digital form in converter 34 and display on the digital range display 35. Thus, in the scan mode, the entire range scale is automatically scanned in a repetitive fashion and each time a target appears during the scan, the scan is interrupted and a digital display provided of the target range.

Finally, in the TRACKING mode, range tracking circuit 50 is activated by means of a tracking control signal (T) from mode control 42. The output of comparator 18 is fed to the range tracking circuit 50 along with the video echoes from radar receiver 15. From the output of comparator 18 pulse signals are generated in range tracking circuit 50 having a time reference to the radar transmitter pulse representing predetermined ranges. These pulses are utilized in conjunction with the video echoes to automatically range track a target represented by these echoes. A voltage is provided from range tracking circuit 50 to selector switching circuits 20 which represents the range of the target being tracked. During the tracking mode, this analog voltage is fed through the selector switching circuits 20 to comparator 18 and gating circuit 30. During the tracking mode, gating circuit 30 is actuated to feed the analog voltage representing the range of the target being tracked to multiplexer 32 and thence to analog/BCD converter 34 and digital range display 35 for display.

During the tracking mode, the analog range voltage is also fed through gating circuit 55 to speed and ETA computer 57. Computer 57 differentiates the range tracking voltage to provide a speed signal and from range and speed generates an ETA (estimated time of arrival) signal. The speed and ETA signals are fed to multiplexer 32 and then converted to digital form in converter 34 from where they are fed to digital speed and ETA display 60. Thus, in the track mode, a continuous display is provided of the range of the target tracked and the speed and estimated time of arrival of the target can be obtained while such target is automatically being tracked.

Figure 2:
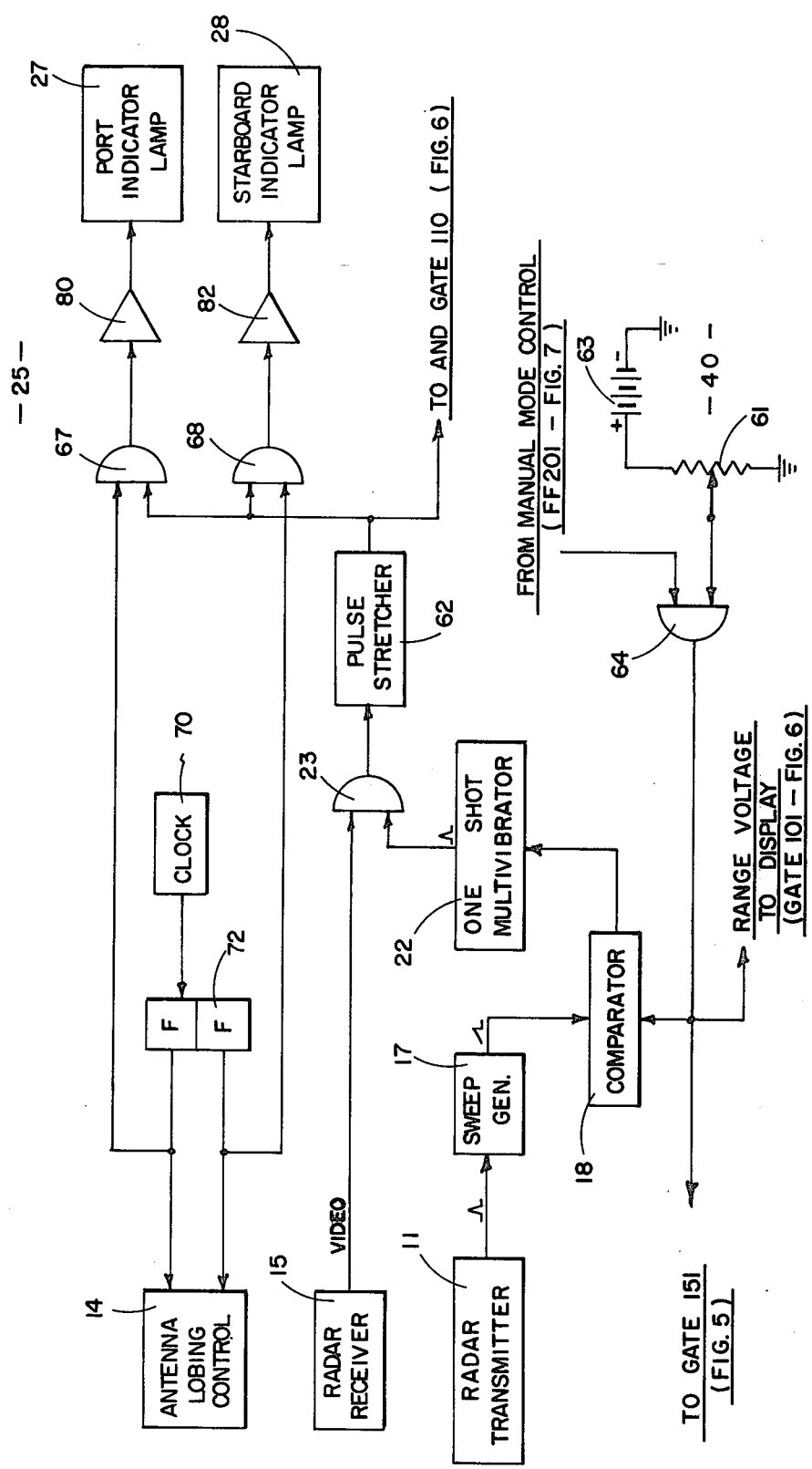
FIG. 2 is a functional block diagram illustrating the manual code of operation of a preferred embodiment of the invention.

Referring now to FIG. 2, a preferred embodiment of the circuitry for the manual mode of operation is schematically illustrated. A range voltage is manually selected by means of potentiometer 61 operating in conjunction with DC power source 63. This DC voltage is fed to AND gate 64. With the mode control in "manual", a gating signal is fed to AND gate 64 from flipflop 201 (FIG. 7), thereby gating the range voltage through to comparator 18 to gate 101 of the display circuits (FIG. 6), and to gate 151 of of the tracking circuit (FIG. 5). As already explained in connection with FIG. 1, a sweep voltage synchronized with the radar transmitter is generated by means of sweep generator 17 and fed to comparator 18 for comparison with the range voltage.

Figure 6:
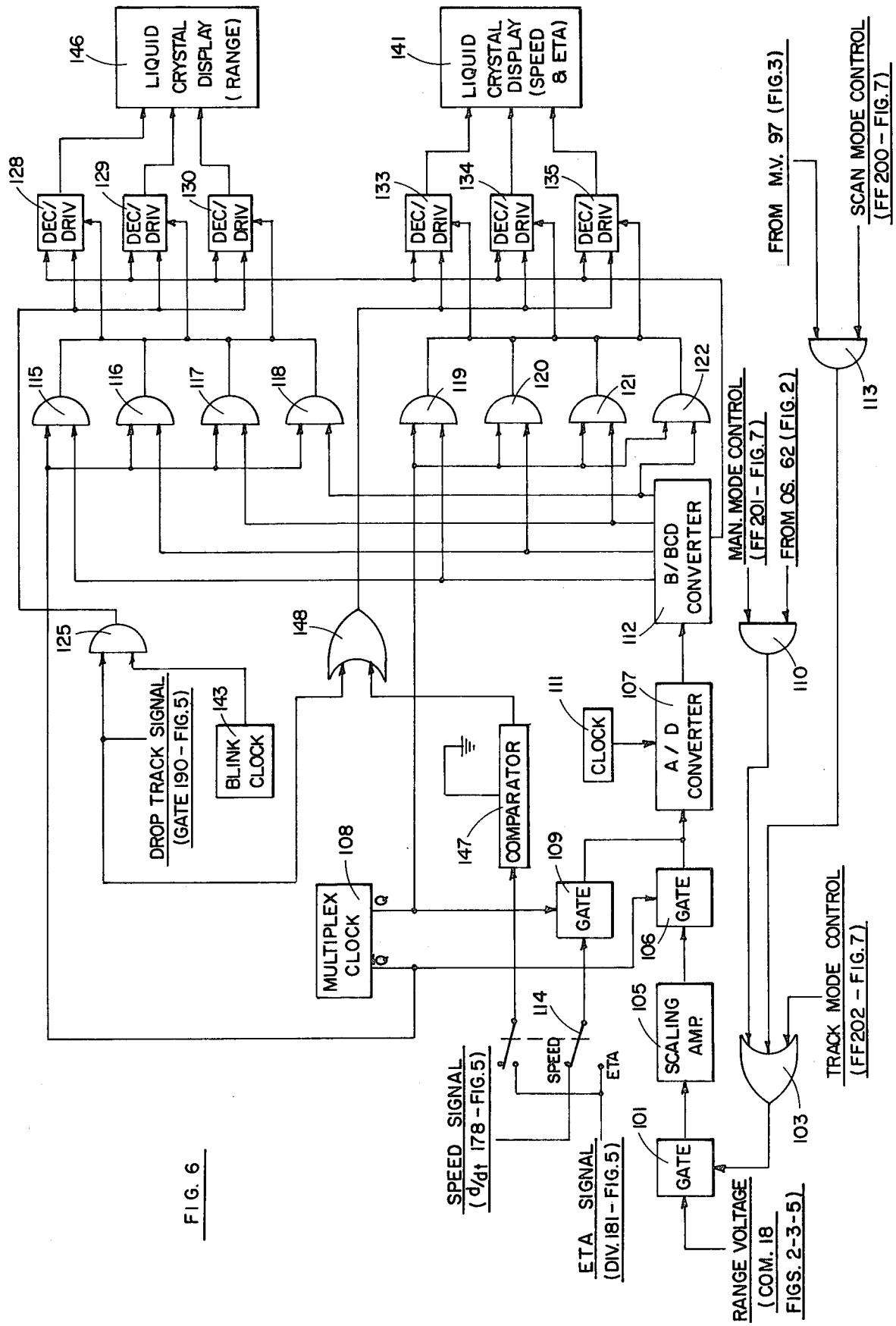
FIG. 6 is a functional block diagram illustrating the display of the preferred embodiment.

When coincidence between these two voltages is reached, one-shot multivibrator 22 is actuated to provide a pulse to AND gate 23. AND gate 23 also receives video echo signals from radar receiver 15. Thus, whenever potentiometer 61 is set to provide a voltage representing the range at which a target appears, the output of one-shot multivibrator will gate video signals representing this target through AND gate 23 to pulse stretcher 62. Pulse stretcher 62 may comprise a one-shot multivibrator having a relatively long time constant (of the order of 200 microseconds). The output of pulse stretcher 62 is fed to AND gates 67 and 68. The output of pulse stretcher 62 is also fed to AND gate 110 (FIG. 6).

Clock 70 provides trigger pulses to flipflop 72 to alternately drive the stages of the flipflop to their "ON" state in a cyclical fashion. Flipflop 72 operates to drive antenna lobing control 14 so as to alternately activate the left and right lobes of the antenna radiation pattern. The outputs of flipflop 72 are also utilized to gate AND gates 67 and 68, thus synchronizing the feeding of signals through these gates with the lobing operation of the antenna. Thus, echo signals arriving during the time that the left lobe is active will be fed through gate 67 to amplifier 80, while signals arriving during right lobing will be fed through gate 68 to amplifier 82. The outputs of amplifiers 80 and 82 are used to activate port indicator lamp 27 and star-board indicator lamp 28 respectively, thus providing an indication as to whether targets are to port or starboard of the vessel's heading. Where the targets are dead ahead, the two lamps will be excited equally. The display of the range voltage during the manual mode of operation will be described further on in the specification in connection with FIG. 6.

Figure 3:
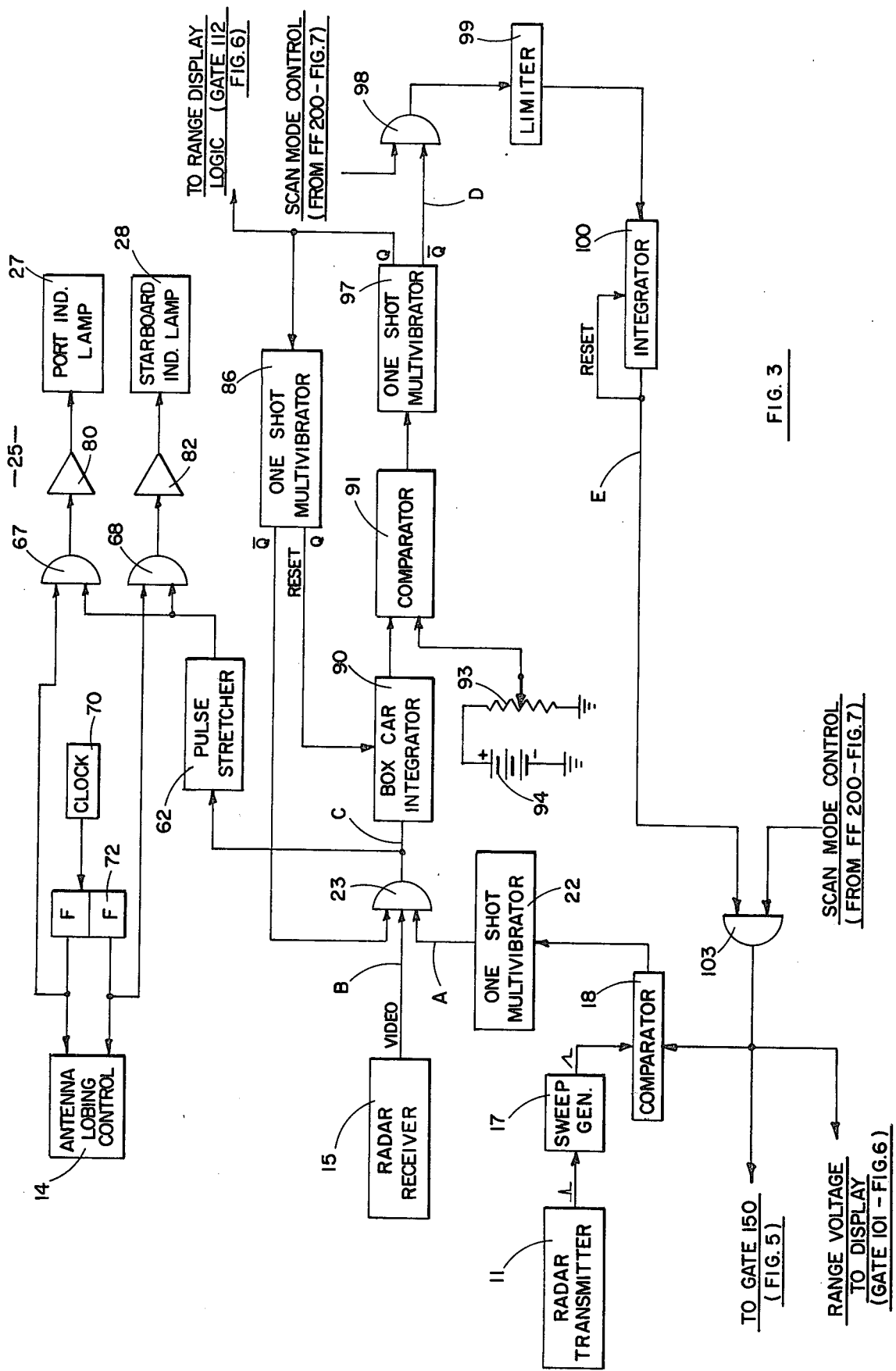
FIG. 3 is a functional block diagram illustrating the scan mode of operation of the preferred embodiment.

Referring now to FIG. 3, the circuitry of the scan mode of operation of the preferred embodiment is schematically illustrated. Attention is also directed to FIGS. 4A-4E which illustrate various waveforms generated in the circuitry of FIG. 3. As already explained in connection with FIG. 2, one-shot multivibrator 22 provides an output "A" (see FIG. 4A) which represents a range in the range scale of the radar, this particular range being determined in comparator 18 which compares the range sweep with the DC range voltage. AND gate 23 also receives video signals "B" (see FIG. 4B). The third input to AND gate 23 comes from one-shot multivibrator 86 and acts to disable the gate only during a very short period of time, as to be explained later. The output of gate 23 comprises a series of pulses "C" (see FIG. 4C) which represents targets which appear at various ranges in the range scan made during the scan mode of operation. The output ("C") of AND gate 23 is fed to pulse stretcher 62 and is used in the same manner as described for the manual mode in connection with FIG. 2, to provide an indication on port and starboard indicator lamps 27 and 28, as to whether the targets are to the port or starboard of the vessel's heading. The output of AND gate 23 is also fed to boxcar integrator 90 which operates in conjunction with comparator 91 to reduce noise signals. Comparator 91 receives a DC voltage from the arm of potentiometer 93, this potentiometer tapping off a selected portion of the voltage output of DC source 94. Potentiometer 93 thus operates as a sensitivity control, the comparator providing an output for driving one-shot multivibrator 97 whenever the integrated voltage output of integrator 90 exceeds the output of potentiometer 93. The Q output of multivibrator 97 is used to drive one-shot multivibrator 86. The Q output of one-shot multivibrator 86 is used to reset integrator 90. The $\overline{Q}$ output of one-shot 86 operates to disable gate 23 for a short period of time to prevent double pausing on the same target. The "$\overline{Q}$" output of multivibrator 97 (see FIG. 4D) is fed to AND gate 98. AND gate 98 also receives a control signal from flipflop 200 (FIG. 7), this control signal being present during the scan mode of operation. The output of AND gate 98 is fed through limiter 99 to integrator 100. Integrator 100 operates to generate the range scan voltage and in the absence of any input thereto from limiter 99, automatically provides a scan voltage running between about 0 and 10 volts in a time period of about 5 seconds, this scanning cycle being automatically repeated each time it is completed by virtue of a reset fed from the output of the integrator to its input. The scanning, however, is interrupted each time a signal is received by the integrator from limiter 99. Under such conditions, the input to the integrator drops to zero and the output of the integrator remains constant for the time period that this signal is being received from the limiter. Typically, one-shot multivibrator 97 is designed to have a time period of 2 seconds such that each time it is fired by a signal from comparator 91, its $\overline{Q}$ output will be present for this time period. This operation is illustrated in FIGS. 4C-4E for a situation where targets appear at ranges corresponding to 4 volts and 6 volts in the scanning cycle of integrator 100. Thus, as can be seen from FIGS. 4C-4E, one-shot multivibrator 97 is triggered by pulses "C" at times when the scan of integrator 100 reaches 4 volts and 6 volts. This results in one-shot multivibrator 97 providing an output "D" which interrupts the scanning "E" of integrator 100 for a period of 2 seconds in each instance. Typically, the system can be calibrated to have a range scale of 1 volt/mile.

The output of integrator 100 is fed to AND gate 103, this gate passing the signal therethrough throughout the scan mode by virtue of the gating signal fed thereto from flipflop 200 (FIG. 7). The integrator output "E" (FIG. 4E) thus provides the "range gate" input to comparator 18 which determines the firing time of one-shot multivibrator 22. It thus should be apparent that when a target appears and the scan pause is initiated, that the video will be gated through AND gate 23 to provide the operation thus described. The range voltage output of AND gate 103 is also fed to gate 101 of the display circuitry (FIG. 6) and to gate 150 of the tracking circuit (FIG. 5). This range voltage is gated through to the digital display only during the 2-second scan pause intervals which are initiated in response to target echoes. This operation is achieved in response to the "Q" output of one-shot multivibrator 97 which is fed to gate 112 of the range display logic (FIG. 6). Thus it can be seen that each time a target echo appears during the range scan cycle, the range scan is interrupted for a period of 2 seconds and during this time, the range of the target is displayed on the digital display. When the 2-second pause period has elapsed, the scan is resumed until the next target appears, whereupon the pause and display operation is repeated. This continues until the end of the scan cycle, whereupon the cycle is automatically repeated.

Referring now to FIG. 5, the track mode of operation is schematically illustrated. If it is desired to range track a target, this can be initiated from either the manual or scan modes of operation. In the manual mode, the manual range selector 40 (FIG. 1) is set to the range at which the selected target appears (indicated by the actuation of port or starboard) indicators 27 and 28), and the "track" button 203c is depressed (see FIG. 7). Immediately prior to the time that the tracking mode of operation is entered, the manually selected range is fed through AND gate 151 to gate 153. Gate 153 passes this voltage through to integrator 154 in response to the gating voltage received thereby from OR gate 155 by virtue of the manual mode control signal received by the OR gate. Integrator 154 thus receives an initializing voltage representing the manually selected range, the integrating operation of the integrator being initiated from this initializing voltage. Similarly, operation can be initiated from the scan mode by depressing scan mode control button 203a (see FIG. 7) during one of the 2-second pauses when a target is present. This will provide an initializing voltage in accordance with the scan range through AND gate 150 and gate 153, OR gate 155 now providing a gating voltage in response to the scan mode control.

Upon depressing the track button, the initializing range voltage derived either from the manual or scan mode is fed to comparator 18 which also receives the sweep voltage from sweep generator 17. Comparator 18 operates as described previously to provide an output signal when the sweep voltage reaches the amplitude of the range voltage. The output of comparator 18 is fed to gate 157 and gated therethrough during the track mode to one-shot multivibrator 160. The output of one-shot multivibrator 160 is fed to one-shot multivibrator 162. Multivibrators 160 and 162 may each have a timing interval of the order of 0.3 microseconds and are part of a conventional early/late gate tracker which operates in the following manner: The video output of radar receiver 15 fed to AND gates 165 and 166 comprises a synthetic video pulse representing the target being tracked having a 0.6 microsecond duration. The outputs of AND gates 165 and 166 are fed to differential amplifier 170. When the target is exactly centered between the "early" and "late" outputs of multivibrators 160 and 162, the outputs of AND gates 165 and 166 will be exactly equal in duration so that the output of differential amplifier will be zero. When the gates from the multivibrators occur slightly in advance of the center of the target, the duration of the signal from gate 165 will be less than that from gate 166, resulting in a positive output from amplifier 170, this output being proportional to the distance of the gates from the center of the target. If the early and late gates occur slightly after the center of the target, a negative output will be generated from amplifier 170. The error signal thus generated is integrated by integrator 150 to add to or subtract from the initializing voltage in a manner as to automatically maintain the range gate on the center of the target, thereby providing the desired tracking operation. During the tracking mode, the range voltage which appears at the output of AND gate 158, i.e., the output of integrator 154, is continually fed to the display circuitry for providing a digital display. The output signal from AND gate 158 is fed to gate 101 (FIG. 6) in implementing this operation.

A speed signal and an ETA signal are generated from the range voltage in the following manner: The range voltage is fed from the output of AND gate 158 through AND gate 175 to amplifier 177. This voltage is then differentiated by means of a differentiator 178, thereby providing a signal is accordance with target speed, which is fed to switch 114 of the display circuitry (FIG. 6). The output of differentiator 178 is also fed to amplifier 180 and thence to divider 181. The signal in accordance with range as appropriately scaled in scaling amplifier 182 is also fed to the divider. The speed signal divided by the scaled range signal provides an output in accordance with estimated time of arrival (ETA) of the target which is fed to switch 114 of the display circuits (FIG. 6).

In the event that the target is lost due to fading and the like, a "drop track" signal is generated in the following manner: The video output of radar receiver 15 is gated through AND gate 23 by the output of one-shot multivibrator 22 in the same manner as described in connection with the manual and scan modes. The output of AND gate 23 is used to drive one-shot multivibrator 186. The output of multivibrator 186 in turn is passed through AND gate 187 whenever the system is in the tracking mode, to drive one-shot multivibrator 188 which has a time period of approximately 3 seconds. When NOR gate 190 is neither receiving a signal from the output of AND gate 187 or from the output of multivibrator 188, the drop track signal is generated, this signal being fed to gate 125 (FIG. 6) for use in generating a blinking of the range voltage display and blanking the speed/ETA display, as to be explained in connection with FIG. 6.

Referring now to FIG. 6, the display circuitry of the preferred embodiment is schematically illustrated. The range voltage representing target ranges is fed from comparator 18 (FIGS. 2, 3 and 5) to gate 101. This gate is controlled by the control signals for the various modes of operation. These control signals are fed to the gate through OR gate 103. During the manual mode of operation, OR gate 103 receives a control signal from AND gate 110, which provides an output when the manual mode flip-flop (FF201, FIG. 7) is actuated, and one-shot flipflop 62 (FIG. 2) has an output indicating the presence of video echoes at a particular range. During the scan mode, a gating signal is provided to OR gate 103 from AND gate 113 when the scan mode control flipflop (FF200, FIG. 7) is actuated and pause control multivibrator 97 (FIG. 3) has been actuated in response to a video echo signal during the scanning cycle. During the tracking mode, OR gate 103 receives a gating signal directly from the track mode control flipflop (FF202, FIG. 7). The output of gate 101 is fed to scaling amplifier 105 where it is appropriately attenuated so that its amplitude is suitable for processing, and then fed to gate 106.

The analog range signals are cyclically gated through gate 106 to analog/digital converter 107 in response to the $\bar{Q}$ output of multiplex clock 108 which is a free running multivibrator having a frequency of the order of .5 Hertz. This multiplexing operation enables utilization of the same analog/digital and binary/binary coded decimal converters for both the range signals and the speed and ETA signals. The speed or ETA signals are alternatively selected by means of switch 114, these signals being fed through the switch to gate 109 which is gated by the Q output of multiplex clock 108. The outputs of gates 106 and 109 are fed to analog/digital converter 107 where they are converted to digital form, the analog/digital converter being operated in response to clock pulses received from clock 111 which may operate at a frequency of the order of 4 kiloHertz.

The output of analog/digital converter 107 is fed to binary/binary coded decimal converter 112 where it is converted to binary coded decimal form. The binary coded decimal output of converter 112 is fed to AND gates 115-118 for the range display and AND gates 119-122 for the speed and ETA display. AND gates 115-118 are gated in response to the Q̄ output of multiplex clock 108, while AND gates 119-122 are gated in response to the Q output of multiplex clock 108. The outputs of AND gates 115-118 are fed to the binary coded decimal inputs of decoder/drivers 128-130, while the outputs of AND gates 119-122 are fed to the binary coded decimal inputs of decoder/drivers 133-135. Digit strobe signals from binary/binary coded decimal converter 112 are fed to decoder/drivers 128-130 and 133-135. Every time a new digit strobe pulse is received, the decoder/driver stores new binary coded decimal data and concurrently unlatches previously stored binary coded decimal data, then decodes the unlatched data. The outputs of drivers 128-130 are used to drive liquid crystal display 140 which provides a digital readout of the range. The outputs of decoder/drivers 133-135 are used to drive liquid crystal display 141 which provides a digital readout of speed or ETA, depending upon the position of switch 114.

If a target being tracked is lost as described in conjunction with FIG. 5, a "drop track" signal is fed to AND gate 125 from gate 190 (FIG. 5). This causes an oscillatory signal which may be of the order of 2 Hertz, generated by blink clock 143, to be gated through AND gate 125 to the "blanking" inputs of each of drivers 128-130, causing a blinking of the indicator elements of the range display 140. The same "drop track" signal is also fed through OR gate 148 to the "blanking" inputs of drivers 133-135, thereby causing the speed and ETA displays to be blanked. When the sailboat is increasing in range with respect to a tracked target, a negative ETA signal is generated. Since a negative valued ETA readout is meaningless in terms of arrival time, it is desirable to blank out the liquid crystal display 141 when switch 114 is in the ETA position. When comparator 147 senses a negative ETA signal from divider 181 (FIG. 5), the output of comparator 147 feeds a signal through OR gate 148 to the blanking inputs of decoder/drivers 133-135, causing the liquid crystal display 141 to become blanked.

Referring now to FIG. 7, circuitry for controlling the mode of operation in the preferred embodiment is schematically illustrated. Pushbutton control 203 includes three momentarily operable switch contacts 203a-203c for the scan, manual, and track modes respectively. Entry into any one of these modes is achieved by momentarily actuating the associated switch contact to provide a positive voltage pulse from DC power source 207 to an associated one of flipflops 200-202. The flipflops are interconnected so that only one at a time can provide an actuation signal on one of output busses 208-210. Thus, when flipflop 200 is actuated, it provides a latching signal to flipflops 201 and 202 to maintain them in the "off"state, similar latching signals being provided from flipflops 201 and 202 to the other two flipflops, as the case may be. This assures mutually exclusive operation in each of the modes.

The system of the invention can be constructed using commercially available integrated circuits. A list of such components is as follows:

| Component | Industry Part No. |
|---|---|
| Drivers | 7416 |
| Flipflops | 7474 |
| AND gates | 7408 |
| OR gates | 7432 |

-continued

| Component | Industry Part No. |
|---|---|
| Analog gates | 4066 |
| One-shot multivibrators | 74123 |
| High Frequency Clocks | 74123 |
| Low Frequency Clocks | 555 |
| Decoder/Driver | 4056 |
| Integrators & Amplifiers | Nat'l Semiconductor #LH0042 |
| Comparators | Nat'l Semiconductor #LM319 |
| Analog/Digital Converter | Siliconics #LD111 |
| Binary/Binary Coded Decimal Converter | Siliconics #LD110 |
| Liquid Crystals | LXD #6051 |

While the invention has been described and illustrated in detail, it is to be clearly understood that this is intended by way of illustration and example only and is not to be taken by way of limitation, the spirit and scope of this invention being limited only by the terms of the following claims.

I claim:

1. In a radar system having a transmitter for transmitting pulsed signals in a fixed beam and a receiver for receiving echoes from targets in the path of said signals and converting said echoes to video signals,
    means responsive to said transmitter for generating a repetitive linear sawtooth sweep signal synchronized with said pulsed signals, the magnitude of said sweep signal representing instantaneous radar range,
    means for generating an analog range signal having a magnitude representing range including a range scan generator,
    means for comparing said sweep signal and said range signal and generating a range pulse signal when said sweep signal reaches the magnitude of said range signal,
    gating means responsive to said last mentioned pulse signal and receiving the video signals from said receiver for providing an output whenever said video signals are in time coincidence with said pulse signal,
    means responsive to the output of said gating means for providing an indication of the presence and relative azimuth of said target echoes,
    means for converting the range signal to digital form,
    scan pause control means for interrupting the scanning operation of said range scan generator for a predetermined period of time, said scan pause control means being responsive to the output of said gating means whereby the scanning operation is interrupted whenever the video and range pulse signals are in time coincidence,
    gating means responsive to said scan pause control means interposed between the range scan generator and said means for converting the range signal to digital form for passing the range signal to said digital converting means only during the times the scanning operation is being interrupted, and
    digital display means for displaying said digital range signal.

2. The system of claim 1 wherein said means for generating said analog range signal comprises a manually operated selector adapted to change the magnitude of said signal to provide said indication of the presence and relative azimuth of said target echoes, and second gating means operating in response to an output from said first mentioned gating means for gating the range signal to said converting means.

3. The system of claim 1 wherein said means for generating said analog range signal comprises a tracking range gate generator responsive to said video signals and the output of said comparing means for providing a range gate signal representing the range of a target being tracked.

4. The system of claim 3 and further comprising means for interrupting the display of said range signal in a cyclical fashion whenever the tracking of said target is interrupted for greater than a predetermined period of time.

5. The system of claim 1 wherein said means for generating an analog range signal comprises manual range selector means for manually selecting a DC voltage, range tracking means responsive to said video signals and the output of said comparing means for providing a range gate signal representing the range of a target being tracked, and range scan generator means for generating a cyclically scanning range voltage, the scanning of which is interrupted whenever the video signals are in time coincidence with the range pulse signal; and switching circuit means for selectively providing either the manually selected voltage, the tracking voltage or the scanning voltage as said range signal.

6. The system of claim 1 wherein said means for converting the range signal to digital form comprises an analog/digital converter for receiving the analog signals and a binary/binary coded decimal converter for converting the output of the analog/digital converter to binary coded decimal form.

7. The system of claim 1 wherein said digital display means comprises a liquid crystal display.

8. In a radar system having a transmitter for transmitting pulsed signals in a fixed beam and a receiver for receiving echoes from targets in the path of said signals and converting said echoes to video signals,
   means responsive to said transmitter for generating a repetitive linear sawtooth sweep signal synchronized with said transmitted pulsed signals, the magnitude of said sweep signal representing instantaneous radar range,
   means for generating a scanning range voltage the magnitude of which represents range,
   means for comparing the repetitive sweep signal which is synchronized with said transmitted pulsed signals with the scanning range signal and generating a range pulse signal when the repetitive sweep signal reaches the magnitude of said scanning range signal,
   gating means responsive to said range pulse signal and receiving the video signals from said receiver for providing an output pulse whenever said video signals are in time coincidence with said range pulse signal,
   scan pause control means responsive to said last mentioned output pulse for interrupting the operation of said range scanning means for a predetermined period of time whenever said output pulse appears,
   means responsive to the output pulse of said gating means for providing an indication of the presence and relative azimuth of said target echoes,
   gating means for gating said range signal only when a pause in the range scan is being effected,
   means receiving the output of said last mentioned gating means for converting the range signal to digital form, and
   digital display means for displaying said digital range signal.

9. The system of claim 8 wherein said means for indicating the presence and relative azimuth of said target echoes comprises lobing means for providing beams of said signals to the left and right of a predetermined center line, a pair of indicators for indicating target echoes to the left and right of said center line respectively, and control logic means for receiving the output of said gating means and responsive to said lobing means for actuating said indicators in accordance with the azimuth of the targets relative to said line of sight.

10. The system of claim 8 wherein said means for converting the range signal to digital form comprises an analog/digital converter and a binary/binary coded decimal converter for converting the output of the analog/digital converter to binary coded decimal form.

11. The system of claim 10 wherein said digital display means comprises a liquid crystal display responsive to the output of said binary/binary coded decimal converter.

12. The system of claim 8 and additionally including means for manually selecting a voltage representing range, range tracking means for providing a range gate signal representing the range of a target being tracked, and switching circuit means for selecting either the manually selected voltage, the range gate signal, or the scanning range voltage as the range signal.

13. In a radar system having a transmitter for transmitting pulsed signals in a fixed beam and a receiver for receiving echoes from targets in the path of said signals and converting said echoes to video signals,
   means responsive to said transmitter for generating a repetitive linear sawtooth sweep signal synchronized with said pulsed signals, the magnitude of said sweep signal representing instantaneous radar range,
   means for generating an analog range signal having a magnitude representing range, comprising a tracking range gate generator responsive to said video signals and the output of said comparing means for providing a range gate signal representing the range of a target being tracked,
   means responsive to said range gate signal for generating signals representing the speed and ETA of the target,
   means for providing a digital display in accordance with said signals representing speed and ETA,
   means for comparing said sweep signal and said range signal and generating a range pulse signal when said sweep signal reaches the magnitude of said range signal,
   gating means responsive to said last mentioned pulse signal and receiving the video signals from said receiver for providing an output whenever said video signals are in time coincidence with said pulse signal,
   means responsive to the output of said gating means for providing an indication of the presence and relative azimuth of said target echoes,
   means for converting the range signal to digital form, and
   digital display means for displaying said digital range signal.

14. In a radar system having a transmitter for transmitting pulsed signals in a fixed beam and a receiver for receiving echoes from targets in the path of said signals and converting said echoes to video signals,
   means responsive to said transmitter for generating a repetitive linear sawtooth sweep signal synchronized with said pulsed signals, the magnitude of said sweep signal representing instantaneous radar range, means for generating an analog range signal having a magnitude representing range, means for comparing said sweep signal and said range signal and generating a range pulse signal when said sweep signal reaches the magnitude of said range signal, gating means responsive to said last mentioned pulse signal and receiving the video signals from said receiver for providing an output whenever said video signals are in time coincidence with said pulse signal, means responsive to the output of said gating means for providing an indication of the presence and relative azimuth of said target echoes, comprising port and starboard indicators, antenna lobing means for alternately directing the transmitted pulsed signals to the left and right of a predetermined line of sight, and control logic means receiving the output of said gating means and responsive to said lobing means for actuating said indicators in accordance with the azimuth of the targets relative to said line of sight, means for converting the range signal to digital form, and digital display means for displaying said digital range signal.

15. In a radar system having a transmitter for transmitting pulsed signals in a fixed beam and a receiver for receiving echoes from targets in the path of said signals and converting said echoes to video signals, means responsive to said transmitter for generating a repetitive linear sawtooth sweep signal synchronized with said transmitted pulsed signals, the magnitude of said sweep signal representing instantaneous radar range, means for generating a scanning range voltage the magnitude of which represents range, means for comparing the repetitive sweep signal which is synchronized with said transmitted pulsed signals with the scanning range signal and generating a range pulse signal when the repetitive sweep signal reaches the magnitude of said scanning range signal, gating means responsive to said range pulse signal and receiving the video signals from said receiver for providing an output pulse whenever said video signals are in time coincidence with said range pulse signal, scan pause control means responsive to said last mentioned output pulse for interrupting the operation of said range scanning means for a predetermined period of time whenever said output pulse appears, means responsive to the output pulse of said gating means for providing an indication of the presence and relative azimuth of said target echoes, gating means for gating said range signal only when a pause in the range scan is being effected, means receiving the output of said last mentioned gating means for converting the range signal to digital form, digital display means for displaying said digital range signal, means for manually selecting a voltage representing range, range tracking means for providing a range gate signal representing the range of a target being tracked, switching circuit means for selecting either the manually selected voltage, the range gate signal, or the scanning range voltage, means responsive to the range gate signal for generating signals representing the speed and ETA of the target, and means for providing a digital display in accordance with the signals representing speed and ETA.

* * * * *